US012650290B2

(12) United States Patent　　　　　(10) Patent No.: US 12,650,290 B2
Ogawa et al.　　　　　　　　　　　(45) Date of Patent: Jun. 9, 2026

(54) DISPLACEMENT MEASURING APPARATUS

(71) Applicant: MITUTOYO CORPORATION, Kanagawa (JP)

(72) Inventors: Keita Ogawa, Kanagawa (JP); Hirokazu Kobayashi, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 188 days.

(21) Appl. No.: 18/796,679

(22) Filed: Aug. 7, 2024

(65) Prior Publication Data

US 2025/0052558 A1　　　Feb. 13, 2025

(30) Foreign Application Priority Data

Aug. 9, 2023　　(JP) ................................. 2023-130544

(51) Int. Cl.
　　*G01B 7/30*　　　　(2006.01)
　　*G01D 5/20*　　　　(2006.01)
(52) U.S. Cl.
　　CPC　*G01B 7/30* (2013.01); *G01D 5/20* (2013.01)
(58) Field of Classification Search
　　CPC ... G01B 7/30; G01B 3/18; G01D 5/20; G01D 5/24438; G01D 5/24447; G01D 5/206
　　See application file for complete search history.

(56) References Cited

U.S. PATENT DOCUMENTS

| | | | |
|---|---|---|---|
| 5,948,105 A | 9/1999 | Skurnik et al. | |
| 2006/0250128 A1* | 11/2006 | Tahara | G01D 5/2086 |
| | | | 324/207.25 |
| 2016/0187160 A1* | 6/2016 | Sasaki | G01D 5/2073 |
| | | | 324/207.17 |
| 2021/0215511 A1* | 7/2021 | Kawatoko | G01D 5/2086 |

FOREIGN PATENT DOCUMENTS

| | | |
|---|---|---|
| JP | 10-47942 | 2/1998 |
| JP | 2006-322927 | 11/2006 |

* cited by examiner

*Primary Examiner* — Daniel R Miller
(74) *Attorney, Agent, or Firm* — Greenblum & Bernstein, P.L.C.

(57)　　　　　　ABSTRACT

There is provided a displacement measuring apparatus capable of reducing power consumption in a sleep mode. An operation mode of a signal processing unit includes a measurement operation execution mode to calculate a displacement or position as a measurement value using a sensor signal from a displacement sensor, and a sleep mode to reduce power consumption compared to the measurement operation execution mode. In the sleep mode, the signal processing unit performs a substitute calculation process at a predetermined sampling frequency to calculate a substitute value related to the displacement or position using fewer sensor signals than in the measurement operation execution mode. The operation-mode control unit assumes that a variation of the displacement sensor has been detected when there is a variation in the substitute value, cancels the sleep mode, and switches the signal processing unit to the measurement operation execution mode.

11 Claims, 17 Drawing Sheets

3200

OPERATION-MODE CONTROL UNIT

MEASUREMENT OPERATION EXECUTION MODE

SLEEP MODE

TIMER          3220

3210

CURRENT-POSITION STORAGE MEMORY

3230

SUBSTITUTE-VALUE STORAGE MEMORY

1A———    1B- - - -    1C—-—-—

$$1A \text{———} \qquad 1B \text{— — —} \qquad 1C \text{—·—·—}$$
$$\overline{1A} \text{———} \qquad \overline{1B} \text{— — —} \qquad \overline{1C} \text{—·—·—}$$

a———  b— — —.

ā———  b̄— — —.

DISPLACEMENT MEASURING APPARATUS

INCORPORATION BY REFERENCE

This application is based upon and claims the benefit of priority from JP patent application No. 2023-130544, filed on Aug. 9, 2023 (DAS code DCF4), the disclosure of which are incorporated herein in its entirety by reference.

BACKGROUND OF THE INVENTION

1. Field of the Invention

The present invention relates to a displacement measuring apparatus.

2. Description of Related Art

Digital micrometers, for example, are known as displacement measuring apparatuses. Such a displacement measuring apparatus has a sleep mode for reducing power consumption when not being used by a user, in addition to a measurement operation execution mode for normally obtaining measurement values. In general, the sleep mode is provided to reduce power consumption by reducing the frequency of spindle position (angle) detection compared to the measurement operation execution mode. For example, the position (angle) is detected at 80 Hz in the measurement operation execution mode, but at 40 Hz in the sleep mode. This leads to longer battery life and reduced maintenance costs.

[Patent Document 1] JP 2006-322927 A
[Patent Document 2] JP H10-47942 A

SUMMARY OF THE INVENTION

It is desired to reduce power consumption in a sleep mode, but the spindle rotation should be read without skipping. Once a spindle starts moving in response to user operation, it is necessary to immediately shift to a measurement operation execution mode to follow the spindle rotation. Therefore, in a conventional sleep mode, the spindle position (angle) is calculated periodically to detect a change in position (angle) even though the frequency is reduced.

However, if all the signal processing necessary to calculate the position (angle) of the spindle is performed for sensor signals, the power consumption is large, and which shortens battery life.

Further reduction in power consumption is required.

A displacement measuring apparatus according to an exemplary embodiment of the present invention includes:

a displacement sensor that outputs a sensor signal with a different period depending on a displacement or position;

a signal processing unit that processes the sensor signal; and an operation-mode control unit configured to switch an operation mode of the signal processing unit, in which the operation mode of the signal processing unit includes:

a measurement operation execution mode to calculate the displacement or position as a measurement value using the sensor signal obtained from the displacement sensor; and a sleep mode to reduce power consumption compared to the measurement operation execution mode, the signal processing unit performs, in the sleep mode, a substitute calculation process at a predetermined sampling frequency to calculate a substitute value related to the displacement or position using a part of the sensor signal to be used in the measurement operation execution mode, and the operation-mode control unit assumes that a variation of the displacement sensor has been detected when there is a variation in the substitute value, cancels the sleep mode, and switches the signal processing unit to the measurement operation execution mode.

In an exemplary embodiment of the present invention, it is preferable that an index number is prepared in advance for the sensor signal to distinguish a pattern of a magnitude relationship of a signal value determined depending on a displacement or position, and the signal processing unit calculates, in the sleep mode, the index number as the substitute value based on a comparison of the magnitude relationship of the signal value of the sensor signal.

In an exemplary embodiment of the present invention, it is preferable that a set of the sensor signals used in the substitute calculation process is to be different for each periodic or non-periodic sampling.

In an exemplary embodiment of the present invention, it is preferable that the operation-mode control unit compares substitute values calculated using the same set of sensor signals as corresponding substitute values, assumes that a variation of the displacement sensor has been detected when the substitute value obtained during a current sampling operation varies from the latest corresponding substitute value, cancels the sleep mode, and switches the signal processing unit to the measurement operation execution mode.

In an exemplary embodiment of the present invention, it is preferable that the signal processing unit calculates, in the sleep mode, an AD conversion value of the sensor signals as the substitute value.

In an exemplary embodiment of the present invention, it is preferable that the displacement measuring apparatus further includes:

a display unit; and a display-mode control unit that switches a mode of the display unit between a display-off mode and a display-on mode, in which the display-mode control unit has a preset amount of variation of the displacement sensor as a display activation threshold to switch from the display-off mode to the display-on mode, and the display-mode control unit cancels the display-off mode and switches to the display-on mode when the variation of the displacement sensor is detected in the sleep mode and the amount of variation of the displacement sensor equal to or greater than the display activation threshold is detected.

In an exemplary embodiment of the present invention, it is preferable the displacement sensor is a rotary encoder that includes a rotor attached to a rotating body and rotates with the rotating body, and a stator disposed opposite the rotor with a predetermined gap, and the rotary encoder is an absolute type rotary encoder that calculates an absolute position within a revolution or half a revolution of the rotor from the sensor signal with a different period.

In an exemplary embodiment of the present invention, it is preferable that the displacement measuring apparatus further includes:

a spindle; and a main frame that holds the spindle to be movable forward and backward in an axial direction, in which the rotor rotates with the spindle, the stator is attached to the main frame, and the signal processing unit calculates, in the measurement operation execution mode, the displacement or position of the spindle as a measurement value from a total number of revolutions of the spindle and the absolute position within a revolution or half a revolution.

A control apparatus of a displacement measuring apparatus according to an exemplary embodiment of the present invention includes:

a signal processing unit that receives a sensor signal with a different period depending on a displacement or position output from a displacement sensor to process the sensor signal; and an operation-mode control unit that switches an operation mode of the signal processing unit, in which the operation mode of the signal processing unit includes:

a measurement operation execution mode to calculate the displacement or position as a measurement value using the sensor signal obtained from the displacement sensor; and a sleep mode to reduce power consumption compared to the measurement operation execution mode, the signal processing unit performs, in the sleep mode, a substitute calculation process at a predetermined sampling frequency to calculate a substitute value related to the displacement or position using a part of the sensor signal to be used in the measurement operation execution mode, and the operation-mode control unit assumes that a variation of the displacement sensor has been detected when there is a variation in the substitute value, cancels the sleep mode, and switches the signal processing unit to the measurement operation execution mode.

A control method of a displacement measuring apparatus according to an exemplary embodiment of the present invention, the displacement measuring apparatus including:

a signal processing unit that receives a sensor signal with a different period depending on a displacement or position output from a displacement sensor to process the sensor signal; and an operation-mode control unit that switches an operation mode of the signal processing unit, the operation mode of the signal processing unit including:

a measurement operation execution mode to calculate the displacement or position as a measurement value using the sensor signal obtained from the displacement sensor; and a sleep mode to reduce power consumption compared to the measurement operation execution mode, the control method includes:

performing, by the signal processing unit a substitute calculation process at a predetermined sampling frequency in the sleep mode to calculate a substitute value related to the displacement or position using a part of the sensor signal to be used in the measurement operation execution mode; and assuming, by the operation-mode control unit, that a variation of the displacement sensor has been detected when there is a variation in the substitute value, cancelling the sleep mode, and switching the signal processing unit to the measurement operation execution mode.

A control program for a displacement measuring apparatus according to an exemplary embodiment of the present invention causes, by incorporating a computer in a control unit of the displacement measuring apparatus, the computer to perform functions of:

a signal processing unit that receives a sensor signal with a different period depending on a displacement or position output from a displacement sensor to process the sensor signal; and an operation-mode control unit that switches an operation mode of the signal processing unit, in which the operation mode of the signal processing unit includes:

a measurement operation execution mode to calculate the displacement or position as a measurement value using the sensor signal obtained from the displacement sensor; and a sleep mode to reduce power consumption compared to the measurement operation execution mode, the signal processing unit performs, in the sleep mode, a substitute calculation process at a predetermined sampling frequency to calculate a substitute value related to the displacement or position using a part of the sensor signal to be used in the measurement operation execution mode, and the operation-mode control unit assumes that a variation of the displacement sensor has been detected when there is a variation in the substitute value, cancels the sleep mode, and switches the signal processing unit to the measurement operation execution mode.

DETAILED DESCRIPTION

Figure 1:
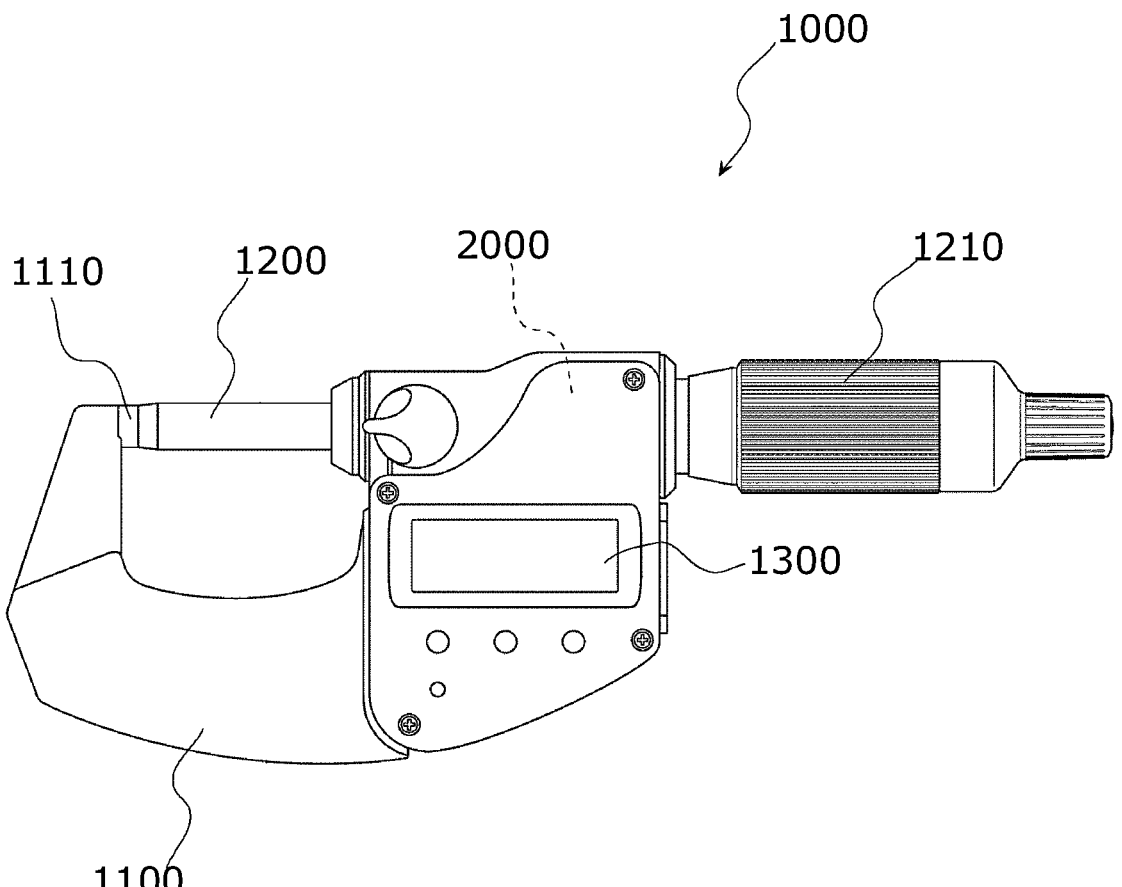
FIG. 1 is an external view of a digital micrometer.

Embodiments of the present invention are illustrated and described with reference to the reference signs assigned to the elements in the drawings.

First Exemplary Embodiment

In the following, a first exemplary embodiment of the present invention is described.

FIG. 1 is an external view of a digital micrometer as a displacement measuring apparatus.

A digital micrometer is described as an example of a small-sized portable digital displacement measuring apparatus, but the present invention is not limited to digital micrometers. The present invention is widely applicable to displacement measuring apparatuses (measuring devices) that measure a dimension of an object to be measured, include a fixed element (a main frame, a main scale, and the like) and a movable element (a spindle, a slider, and the like) provided to be movable relative to the fixed element and to be brought into direct or indirect contact with the object to be measured, and detect the relative displacement or position between the movable element and the fixed element with a displacement sensor. Examples include digital calipers, digital dial gauges (digital indicators), and the like. The present invention is suitable for small-sized portable measuring devices powered by batteries in terms of reducing power consumption, but is also effective when applied to large measuring machines.

FIG. 1 is an external view of a digital micrometer.

Figure 2:
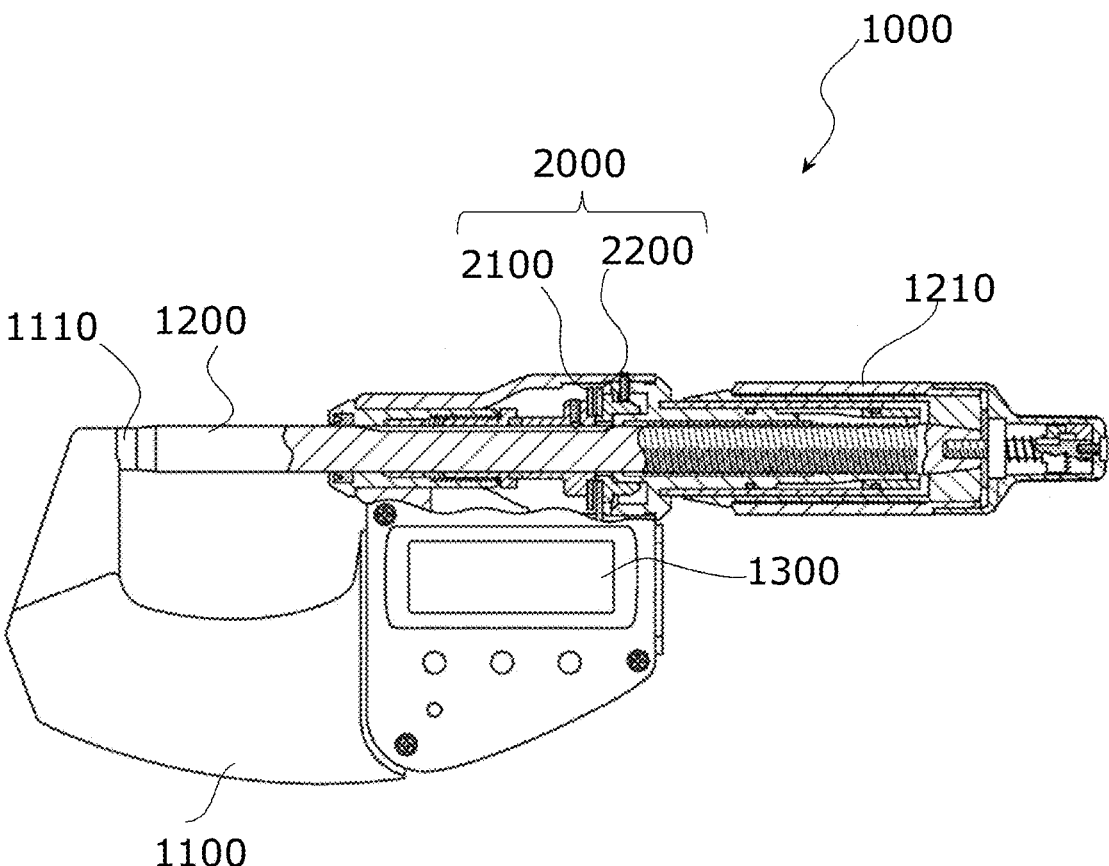
FIG. 2 is a partial cross-sectional view of the digital micrometer.

FIG. 2 is a partial cross-sectional view of the digital micrometer.

A digital micrometer 1000 includes a main frame 1100 as a fixed element, a spindle (a rotating body) 1200 as a movable element, a displacement sensor 2000, a control unit 3000, and a display unit 1300.

The main frame 1100 is U-shaped, includes an anvil 1110 at one end, and holds the spindle 1200 at the other end. Note that the main frame 1100 may be, for example, a micrometer head that does not include the anvil 1110 in the main frame 1100.

The spindle 1200 is screwed to the main frame 1100 and is moved in an axial direction by a rotation operation. That is, the spindle 1200 is a rotating body that rotates, and is a movable element that moves in the axial direction by rotation. The spindle 1200 is brought into contact with an object to be measured in order to obtain a dimension of the object to be measured from the position of the spindle 1200 when the spindle 1200 and the anvil 1110 sandwich the object to be measured.

The displacement sensor 2000 is a sensor that detects the displacement or position of the spindle (movable element) 1200. Here, the displacement sensor 2000 is what is called a rotary encoder 2000, and detects the rotation (rotation angle) of the spindle 1200.

The displacement sensor 2000 includes a rotor (scale) 2100 provided to rotate integrally with the spindle 1200, and a stator (detector head) 2200 disposed opposite the rotor 2100 with a predetermined gap.

Figure 3:
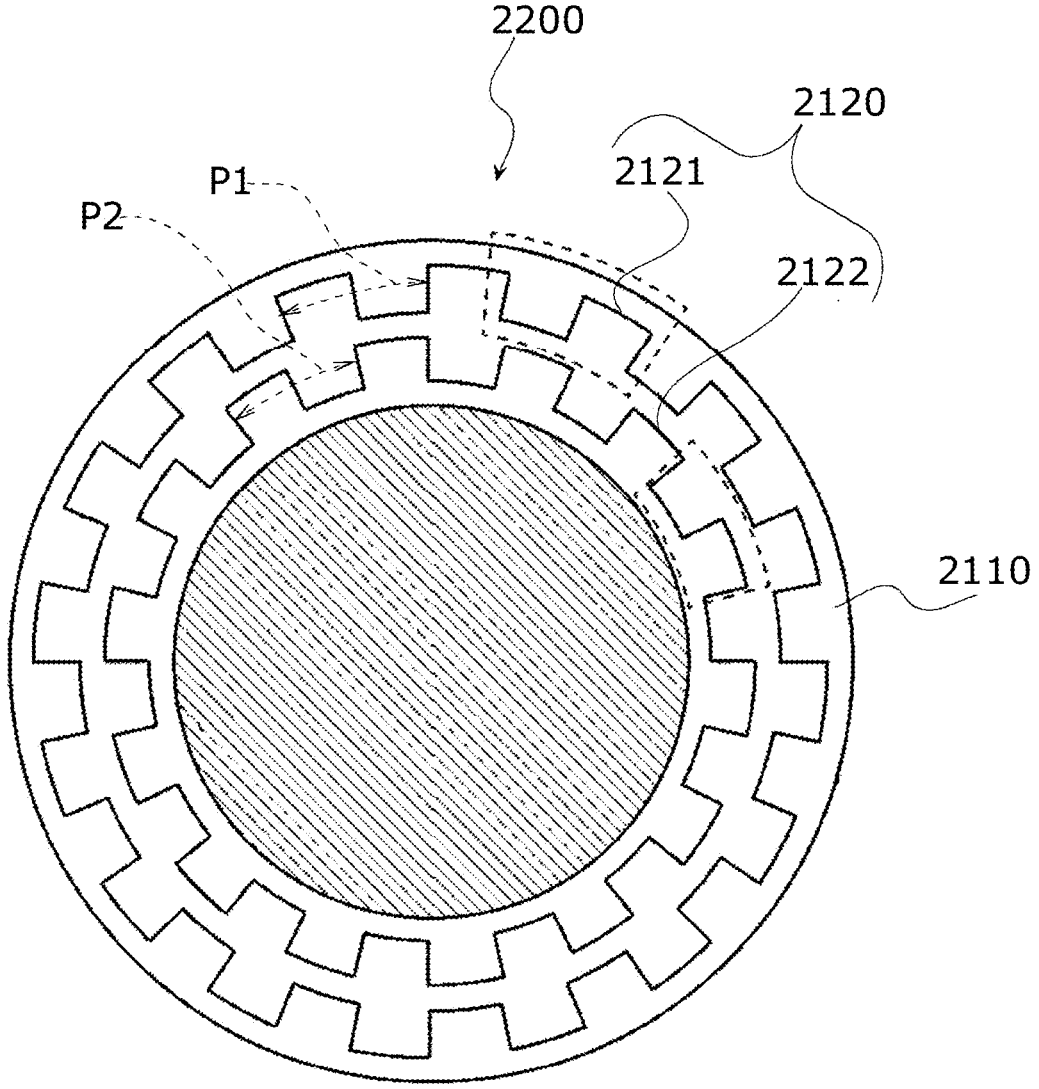
FIG. 3 is a diagram showing an example of a scale pattern of a rotor of a rotary encoder.

FIG. 3 is a diagram showing an example of a scale pattern of a rotor of a rotary encoder.

Figure 4:
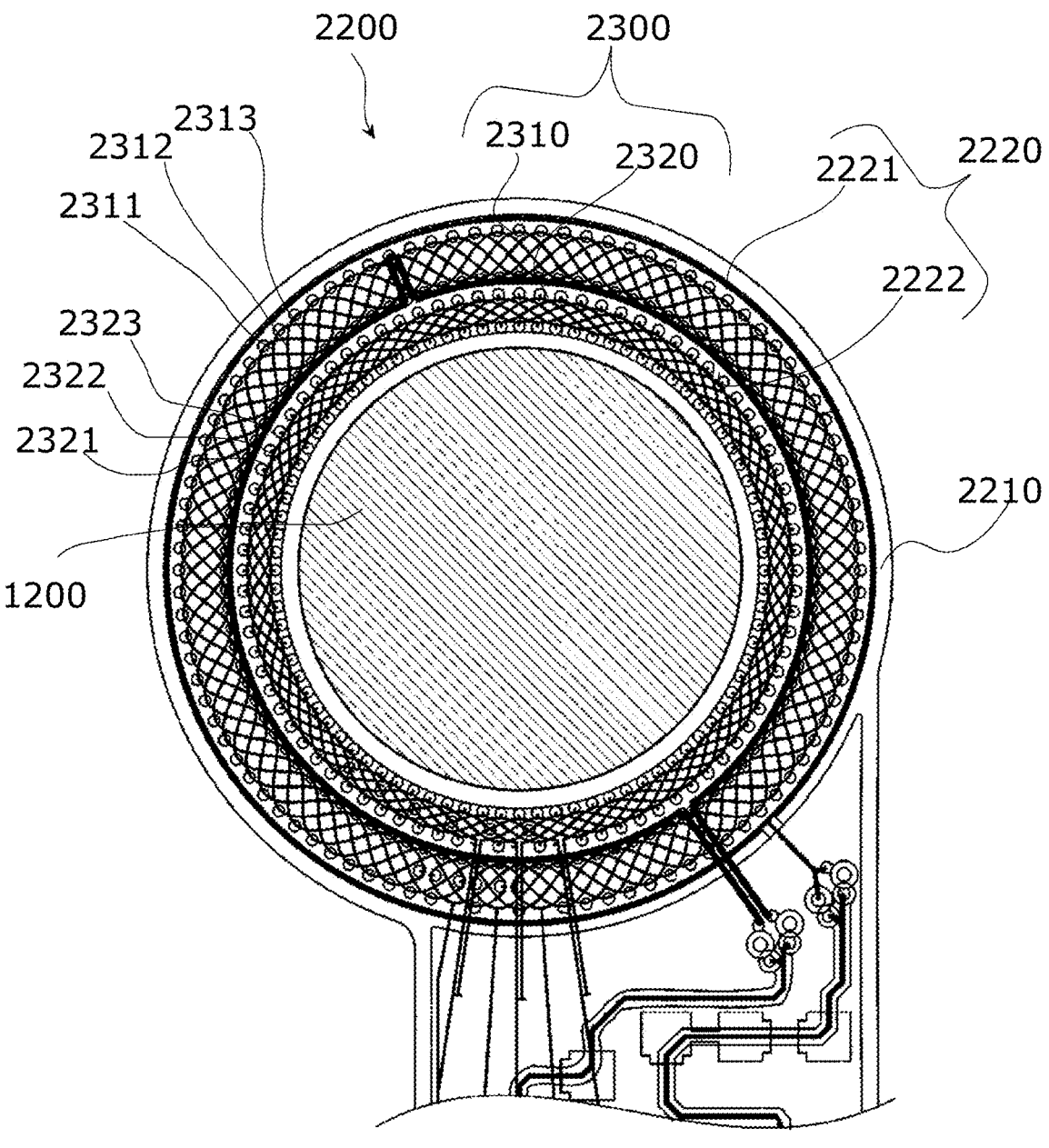
FIG. 4 is a diagram showing an example of a detection unit of a stator of the rotary encoder.

FIG. 4 is a diagram showing an example of a detection unit of a stator of the rotary encoder.

Here, an electromagnetic induction type encoder is described as an example.

The rotor 2100 is formed as a substantially doughnut-shaped plate having a multi-track (in this case, two-track) scale pattern 2120 on the surface at the side of the stator 2200.

Specifically, the rotor 2100 has a rotor substrate 2110, which is a substantially circular insulating board, a first rotor pattern (first scale pattern) 2121, and a second rotor pattern (second scale pattern) 2122. The first rotor pattern 2121 is a scale pattern with a pitch (one period) of P1. The second rotor pattern 2122 is a scale pattern with a pitch (one period) of P2.

In the case of the rotary encoder 2000, the positioning direction (angle measurement direction) is the rotation direction (the direction along the circumference), and the scale pattern 2120 is disposed in a circle along the rotation direction (the direction along the circumference). The pitch (period) of the first rotor pattern 2121 and the pitch (period) of the second rotor pattern 2122 are different from each other. The same combination of a phase of the first rotor pattern 2121 and a phase of the second rotor pattern 2122 has only one place (one angle) within a revolution of the rotor 2100, and the rotation angle of the rotor 2100 is uniquely calculated by combining the two.

Here, the pitch (period) of the first rotor pattern 2121 is finer. In other words, the first rotor pattern 2121 is a dense scale pattern (also referred to as a fine scale pattern) and the second rotor pattern 2122 is a coarse scale pattern (also referred to as a sub-scale pattern). As an example of the scale pattern 2120, a single connected square wave circular coil is described, but the scale pattern 2120 may be formed in a sinusoidal wave or by separate coils.

Here, since an electromagnetic induction type encoder is used as an example, the rotor patterns (scale pattern) 2121 and 2122 are coil patterns, but the rotor patterns (scale pattern) 2121 and 2122 may be bright/dark (reflective/non-reflective or transparent/non-transparent) patterns if the encoder is a photoelectric type, or capacitor electrode patterns if the encoder is a capacitance type. In the case of the rotary encoder 2000, the positioning direction is the rotation direction (the direction along the circumference), and the scale pattern 2120 is disposed in a circle along the rotation direction (the direction along the circumference). In the case of a linear encoder, the length measurement direction (positioning direction) is the longitudinal direction of the longitudinal scale, and the scale pattern 2120 is disposed linearly along the longitudinal direction.

The stator 2200 has transmitting coil and receiving coil patterns as a detection unit for detecting the rotation angle (rotation position) of the rotor 2100. Specifically, the stator 2200 includes a stator substrate 2210, which is a substantially circular insulating board, a drive signal transmitter 2220, and a detection signal receiver 2300. Here, the drive signal transmitter 2220 and the detection signal receiver 2300 are electrode wires concentrically disposed on the stator substrate 2210.

The drive signal transmitter 2220 is a transmitting coil that couples magnetic flux with the first rotor pattern 2121 and the second rotor pattern 2122 of the rotor 2100 to generate an induced electromotive force in the first and second rotor patterns 2121 and 2122. Here, the drive signal transmitter 2220 is constituted by two circular coils. A transmitting coil disposed on the outer side of the stator substrate 2210 and coupled with the first rotor pattern 2121 is referred to as a first transmitting coil 2221. A transmitting coil disposed near on the inner side of the stator substrate 2210 and coupled with the second rotor pattern 2122 is referred to as a second transmitting coil 2222.

The detection signal receiver 2300 is a receiving coil that couples magnetic flux with the first rotor pattern 2121 and the second rotor pattern 2122 of the rotor 2100 to read sensor signals from the first rotor pattern 2121 and the second rotor pattern 2122 according to the position (rotation position). Here, the detection signal receiver 2300 is constituted by two sets of circular coils. A receiving coil disposed on the outer side of the stator substrate 2210 and coupled with the first rotor pattern 2121 is referred to as a first receiving coil 2310. A receiving coil disposed on the inner side of the stator substrate 2210 and coupled with the second rotor pattern 2122 is referred to as a second receiving coil 2320.

The first receiving coil 2310 is constituted by three phase coils, the phases of which are shifted by 120° from each other. The three phase coils constituting the first receiving coil 2310 are referred to as a 1A phase receiving coil 2311, a 1B phase receiving coil 2312, and a 1C phase receiving coil 2313. The pitch (period) of each of the coils of the first receiving coil 2310 (the 1A phase receiving coil 2311, the 1B phase receiving coil 2312, and the 1C phase receiving coil 2313) is P1, which is the same as the pitch (period) of the first rotor pattern 2121.

The second receiving coil 2320 is constituted by three phase coils, the phases of which are shifted by 120° from each other. The three phase coils constituting the second receiving coil 2320 are referred to as a 2A phase receiving coil 2321, a 2B phase receiving coil 2322, and a 2C phase receiving coil 2323. The pitch (period) of each of the coils of the second receiving coil 2320 is P2, which is the same as the pitch (period) of the second rotor pattern 2122.

In the present exemplary embodiment, the receiving coils 2310 and 2320 as the detection signal receiver 2300 are arranged to be sinusoidal waves, but may be rhombic, rectangular, or the like. In addition, the first receiving coil 2310 and the second receiving coil 2320 each described as having three phases, but may have one phase, two phases, four phases, or more. In the case of the first exemplary embodiment, the first receiving coil 2310 needs to have two or more phases in order to calculate a substitute value, which will be described later. However, if absolute position detection is only performed by composing sensor signals with different periods, the first receiving coil 2310 and the second receiving coil 2320 may each have one phase. In addition, since a substitute value in the present invention is not limited to the first exemplary embodiment, there is no need to limit the first receiving coil 2310 to more than two phases in the interpretation of the present invention.

Since an electromagnetic induction type encoder is used as an example in the present exemplary embodiment, the drive signal transmitter 2220 and the detection signal receiver 2300 of the stator (detection head) 2200 are electrode wires, but may be a combination of a light source and a light receiving element in the case of a photoelectric type, or electrode patterns of a transmitting electrode and a capacitor in the case of a capacitance type.

In order to detect the angle (position) of the rotor 2100, drive current pulses are applied to the transmitting coils (the first transmitting coil 2221 and the second transmitting coil 222) of the drive signal transmitter 2220. Then, by coupling with the transmitting coils (the first transmitting coil 2221 and the second transmitting coil 2222), an electromotive force (induced current) is generated in the first rotor pattern 2121 and the second rotor pattern 2122. In the first receiving coil 2310 of the stator 2200 coupled with the first rotor pattern 2121 of the rotor 2100, an electromotive force (induced current) of a magnitude corresponding to the degree of overlap between the two is generated and extracted as a sensor signal. Similarly, in the second receiving coil 2320 of the stator 2200 coupled with the second rotor pattern 2122 of the rotor 2100, an electromotive force (induced current) of a magnitude corresponding to the degree of overlap between the two is generated and extracted as a sensor signal. The sensor signal received at the first receiving coil 2310 is referred to as a first sensor signal. The sensor signal received at the second receiving coil 2320 is referred to as a second sensor signal. The phase obtained from the sensor signal at the first receiving coil 2310 and the phase obtained from the sensor signal at the second receiving coil 2320 are combined to calculate the absolute position (angle) of the rotor 2100 within a revolution.

However, even though the rotary encoder 2000 is an absolute position detection type rotary encoder, the absolute position can only be calculated within a revolution. Therefore, in order to calculate the position of the spindle 1200, that is, the total amount of displacement of the spindle 1200, information on the total number of revolutions is necessary. For the number of revolutions, when the rotor 2100 rotates once, the number of revolutions is counted up if the rotation is in the positive direction or counted down if the rotation is in the negative direction.

In the case of a linear encoder, it is necessary to count the number of periods (length periods) in which the absolute position can be calculated. This may be referred to as the number of revolutions (number of rotations or rounds), the number of cycles, or the number of units. When the absolute position can be calculated within half a revolution or 45° revolution (that is, the period (length period) to calculate the absolute position is 180° or 90°), instead of a revolution) (360°) of the rotor, due to the configuration of an absolute position detection type rotary encoder, half a revolution or 45° revolution may be referred to as a turn, a rotation, or a round (number of rotations or rounds), or the number of cycles or the number of units.

If the number of revolutions is skipped, this causes an error in the measurement value by the pitch of the spindle feed screw (for example, 0.5 mm).

Figure 5:
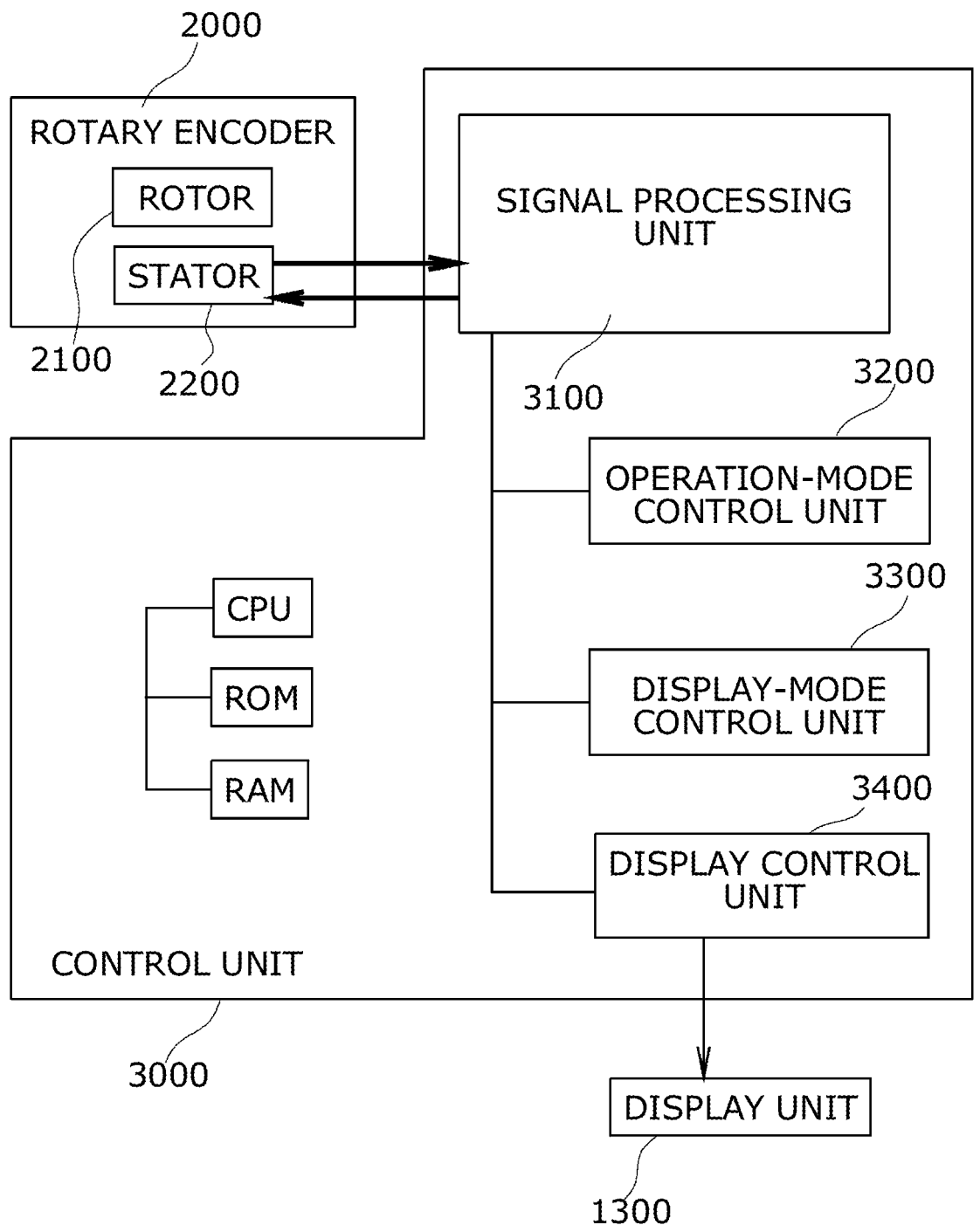
FIG. 5 is a functional block diagram showing a control unit.

FIG. 5 is a functional block diagram showing the control unit 3000.

The control unit 3000 may be what is called a computer including a storage device (ROM, RAM) and a central processing unit (CPU) as hardware. The computer may be operated as each functional unit by executing a program (a control program for the displacement measuring apparatus 1000) stored in the storage device (ROM, RAM). The control program for the displacement measuring apparatus 1000 may be recorded on a nonvolatile recording medium (a CD-ROM, a memory card, or the like) and distributed, or may be downloaded via an internet line or the like.

The control unit 3000 processes a sensor signal from the displacement sensor 2000 and controls the overall operation.

The control unit 3000 includes a signal processing unit 3100, an operation-mode control unit 3200, a display-mode control unit 3300, and a display control unit 3400.

Figure 6:
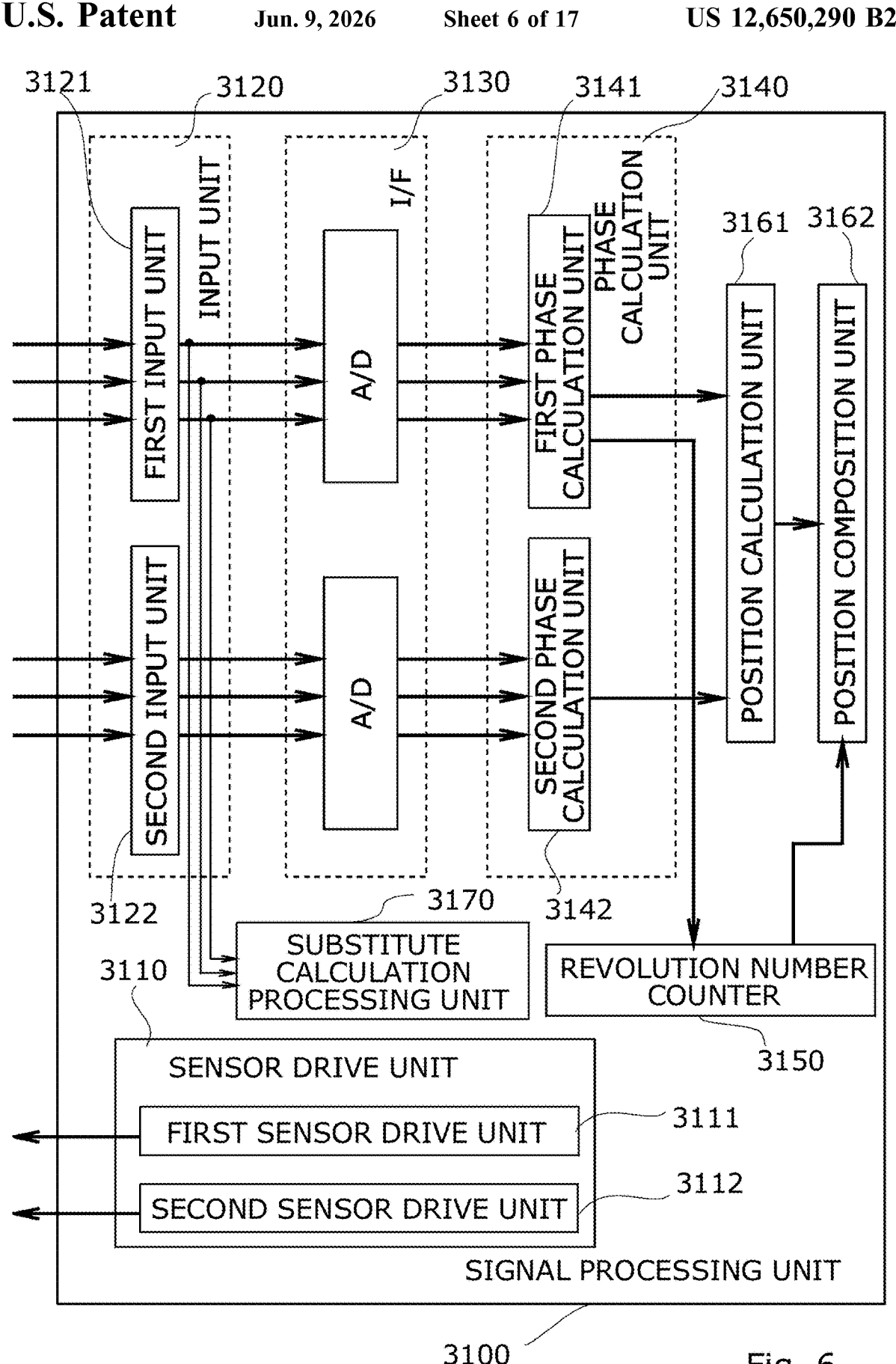
FIG. 6 is a functional block diagram showing a signal processing unit.

FIG. 6 is a functional block diagram showing the signal processing unit 3100.

The signal processing unit 3100 includes a sensor drive unit 3110, an input unit 3120, an AD converter 3130, a phase calculation unit 3140, a position calculation unit 3161, a revolution number counter 3150, a position composition unit 3162, and a substitute calculation processing unit 3170.

Here, the substitute calculation processing unit 3170 that operates in a sleep mode is mainly described in the present exemplary embodiment. The other functional units mainly operate in a measurement operation execution mode and are basically known as the signal processing unit 3100 of the displacement sensor 2000.

Note that the measurement operation execution mode is a normal operation mode when an object is measured with a measuring device to detect the displacement or position (rotation angle) of the spindle (movable element) 1200 in real time (or at high frequency) and continuously calculate the position of the spindle (movable element) 1200.

In the present exemplary embodiment, it is necessary to detect the rotation of the spindle 1200 at least at a frequency at which each rotation of the spindle 1200 is not skipped in the measurement operation execution mode. In general, when a thimble 1210 (or ratchet thimble 1210) of the micrometer 1000 is thin, a user can rotate the spindle 1200 at a relatively high speed. Here, it is assumed that the minimum time for the user to intentionally rotate the spindle 1200 at a high speed for a revolution when an object to be measured is measured is no less than $\frac{1}{80}$ second and that the signal processing unit 3100 performs rotation detection and position calculation at 80 Hz. However, this operation frequency may be adjusted according to the type and size of the measuring device. Since the absolute position can be detected within a revolution, the user is only required to read the rotation without skipping. Therefore, compared to, for example, an incremental type that constantly counts angle changes, the intermittent angle detection is sufficient, and it is possible to reduce the frequency of position (angle) detection and power consumption.

The following is a brief description of the operation of each functional unit in the measurement operation execution mode.

First, drive current pulses are applied from the sensor drive unit 3110 to the drive signal transmitter 2220 (the first transmitting coil 2221 and the second transmitting coil 2222) of the stator 2200. Then, by coupling with the transmitting coils (the first transmitting coil 2221 and the second transmitting coil 2222), an electromotive force (induced current) is generated in the first rotor pattern 2121 and the second rotor pattern 2122. In the first receiving coil 2310 of the stator 2200 coupled with the first rotor pattern 2121 of the rotor 2100, an electromotive force (induced current) of a magnitude corresponding to the degree of overlap between the two is generated, and this is a sensor signal. Similarly, in the second receiving coil 2320 of the stator 2200 coupled with the second rotor pattern 2122 of the rotor 2100, an electromotive force (induced current) of a magnitude corresponding to the degree of overlap between the two is generated, and this is a sensor signal.

The sensor signals from the first receiving coil 2310 and the second receiving coil 2320 are input to the input unit 3120. The input unit 3120 includes a first input unit 3121 and a second input unit 3122. The sensor signal from the first receiving coil 2310 is input to the first input unit 3121, and the sensor signal from the second receiving coil 2320 is input to the second input unit 3122. The input unit 3120 is an analog signal input unit that performs, for example, signal amplification and shaping (filter processing). The AD converter 3130 is disposed at the latter stage of the input unit 3120 as an analog interface. The sensor signals digitized at 12 or 16 bits by the AD converter 3130 (for example, a sample-and-hold circuit) are input to the phase calculation unit 3140.

The sensor signal from the first receiving coil 2310 is calculated and processed by a first phase calculation unit 3141 to obtain a first phase. The sensor signal from the second receiving coil 2320 is calculated and processed by a second phase calculation unit 3142 to obtain a second phase. In the phase calculation unit 3140, the phase is calculated from the signal value of each sensor signal using an inverse trigonometric function. For example, by regarding a three-phase signal with a 120° phase difference as a two-phase signal with a 90° phase difference, the phases are calculated using the inverse trigonometric function (for example, arctan). The first phase obtained from the sensor signal from the first receiving coil 2310 and the second phase obtained from the sensor signal from the second receiving coil 2320 are combined by the position calculation unit 3161. This allows the absolute position (angle) within a revolution of the rotor 2100 to be calculated.

In addition, when the rotation of the rotor 2100 and its rotation direction are detected from the sensor signal from the first receiving coil 2310, and the rotation is counted by the revolution number counter 3150. When the rotor 2100 rotates once, the number of revolutions is counted up if the rotation is in the positive direction, and the number of revolutions is counted down if the rotation is in the negative direction. The position composition unit 3162 convers the actual position of the spindle 1200 from the number of revolutions of the spindle 1200, the rotation angle within a revolution to calculate the absolute position (measurement value) of the spindle 1200.

When the mode is the measurement operation execution mode and in a display-on mode, the position (measurement value) of the spindle 1200 is displayed on the display unit 1300. This point will be described later.

(Sleep Mode)

Figure 7:
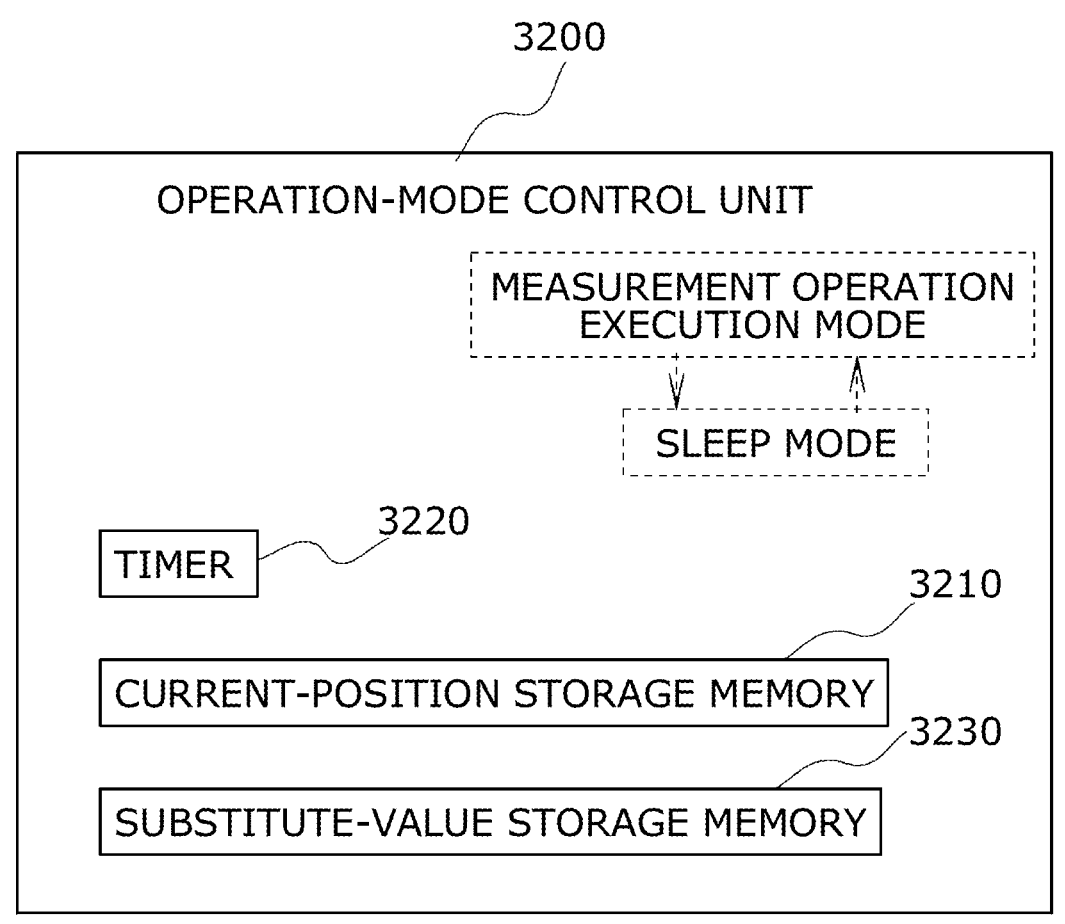
FIG. 7 is a functional block diagram showing an operation-mode control unit.

FIG. 7 is a functional block diagram showing the operation-mode control unit 3200.

The operation-mode control unit 3200 includes a current-position storage memory 3210, a timer 3220, and a substitute-value storage memory 3230.

The operation-mode control unit 3200 controls the switching of the operation mode of the signal processing unit 3100 between the measurement operation execution mode and the sleep mode. The switching from the measurement operation execution mode to the sleep mode may be triggered in a conventional manner. For example, the user may explicitly operate to select the sleep mode, or the mode may be automatically switched to the sleep mode when the micrometer 1000 is not in use for a certain period of time. The operation-mode control unit 3200 determines that the micrometer 1000 is not in use if the timer 3220 is activated and the current position is not changed for a certain period of time, stores the latest position information obtained by the position composition unit 3162 in the current-position storage memory 3210, and switches the operation mode of the signal processing unit 3100 to the sleep mode.

The operation of the signal processing unit 3100 in the sleep mode is described below.

The sleep mode is an operation mode to reduce power consumption when the user is not using the micrometer (measuring device) 1000. In general, in the sleep mode, the frequency of position (angle) detection by the signal processing unit 3100 is reduced compared to the measurement operation execution mode to reduce power consumption. For example, position (angle) detection is performed at 80 Hz in the measurement operation execution mode, but at 40 Hz in the sleep mode. Even with this method, power consumption can be reduced to $\frac{1}{2}$ or less. In order to further reduce power consumption, a substitute value related to the displacement or position that can detect a variation of the displacement sensor 2000 (rotary encoder 2000) is used in the present exemplary embodiment, instead of completely calculating the position (angle).

The functional units of the signal processing unit 3100 that operate during the sleep mode are the sensor drive unit 3110, a part of the input unit 3120, and the substitute calculation processing unit 3170. The other functional units do not operate and are in a standby state. Therefore, power consumption can be significantly reduced. Since considerable power is required for AD conversion of multiple analog signals and phase calculation in the latter stages, the power reduction effect of not performing AD conversion and phase calculation is significant.

In the sleep mode, the signal processing unit 3100 applies a drive current from the sensor drive unit 3110 to the drive signal transmitter 2220 of the stator 2200 at the frequency of 40 Hz. The operation frequency of 40 Hz is an example, and a lower frequency (predetermined sampling frequency) than that in the measurement operation execution mode is sufficient. The lower operation frequency can further reduce power consumption. However, the power required for a single operation in the sleep mode in the present exemplary embodiment is much lower than that in the "measurement operation execution mode", and a reduction in power consumption can be achieved even if the operation frequency is the same (80 Hz), and furthermore, the purpose of a reduction in power consumption can be achieved even if the operation frequency is increased. Therefore, it does not necessarily exclude the case where the sampling frequency in the sleep mode is higher than the sampling frequency in the measurement operation execution mode.

Even though a reduction in power consumption in the sleep mode is desired, the rotation of the spindle 1200 should be read without skipping. Once it is detected that the spindle 1200 starts to rotate, that is, that there is a variation of the rotary encoder (displacement sensor) 2000, the operation mode needs to be immediately switched to the measurement operation execution mode in order to follow the rotation of the spindle 1200. Although it is unlikely that a user suddenly operates a measuring device in the sleep mode by rotating it at high speed, the spindle 1200 should not be rotated more than a revolution before the operation mode returns to the measurement operation execution mode from the sleep mode and the rotation position of the spindle 1200 is calculated. The operation frequency in the sleep mode is appropriately adjusted according to the characteristics of the substitute value (resolution that can detect a variation), which will be described later, the characteristics of the measuring device and the displacement sensor 2000 (for example, the difference between the micrometer 1000 and a caliper), user characteristics and preferences.

In the present exemplary embodiment, the rotor 2100 has the multi-track (in this case, two-track) scale pattern 2120, but it is not necessary to read all the tracks of the rotor 2100 in the sleep mode, and it is only necessary to read information on fewer tracks. Even if the rotor 2100 has N tracks, information on M tracks, which is less than N, is to be read in the sleep mode. Here, N and M are integers that satisfy $N>M\geq1$. In the present exemplary embodiment, the rotor 2100 has the first rotor pattern 2121 (first scale pattern) and the second rotor pattern 2122 (second scale pattern). In the sleep mode in the present exemplary embodiment, only the first rotor pattern 2121 (first scale pattern), which is dense in pitch, is used. This is because the densely pitched first rotor pattern 2121 (first scale pattern) is considered to be more effective in detecting a variation. In applying a drive current from the sensor drive unit 3110 to the drive signal transmitter 2220 of the stator 2200, the drive current is only required to be applied to the first transmitting coil 2221 if the first transmitting coil 2221 and the second transmitting coil 2222 can be separately and independently driven.

A drive current is applied to the first transmitting coil 2221 from a first sensor drive unit 3111 of the sensor drive unit 3110. Then, an electromotive force (induced current) is induced in the first rotor pattern 2121 coupled with the first transmitting coil 2221. In the first receiving coil 2310 of the stator 2200 coupled with the first rotor pattern 2121, an electromotive force (induced current) of a magnitude corresponding to the degree of overlap between the two is generated. Since the first receiving coil 2310 has three phases from the 1A phase receiving coil 2311, the 1B phase receiving coil 2312, and the 1C phase receiving coil 2313, a three-phase sensor signal is input to the first input unit 3121 of the signal processing unit 3100. After amplification and shaping processes in the first input unit 3121, the three-phase sensor signal is input to the substitute calculation processing unit 3170.

Figure 9:
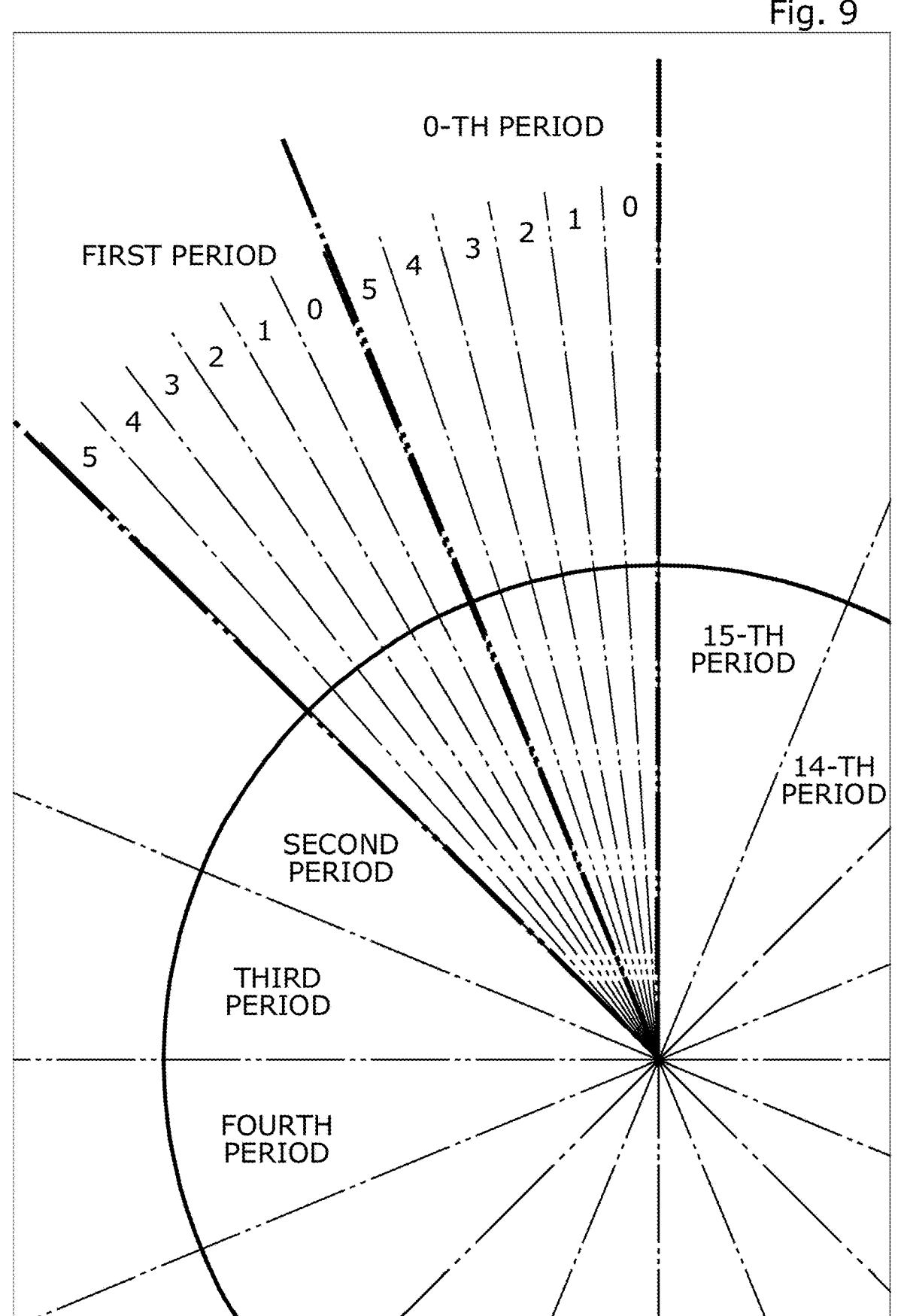
FIG. 9 is a diagram showing, as an example, one period of a first rotor pattern divided into six stages with index values.

The substitute calculation processing unit 3170 divides a single period into several segments based on the magnitude relationship of the three-phase sensor signal. In one revolution, the first rotor pattern 2121 of the rotor 2100 shown in FIG. 3 is divided into 16 periods from 0 to 15 (see FIG. 9). In addition, each period can be divided into six using a simple pattern of magnitude comparison of the three-phase signal with a 120° phase difference. The sensor signal received at the first receiving coil 2310 is the first sensor signal.

Figure 10:
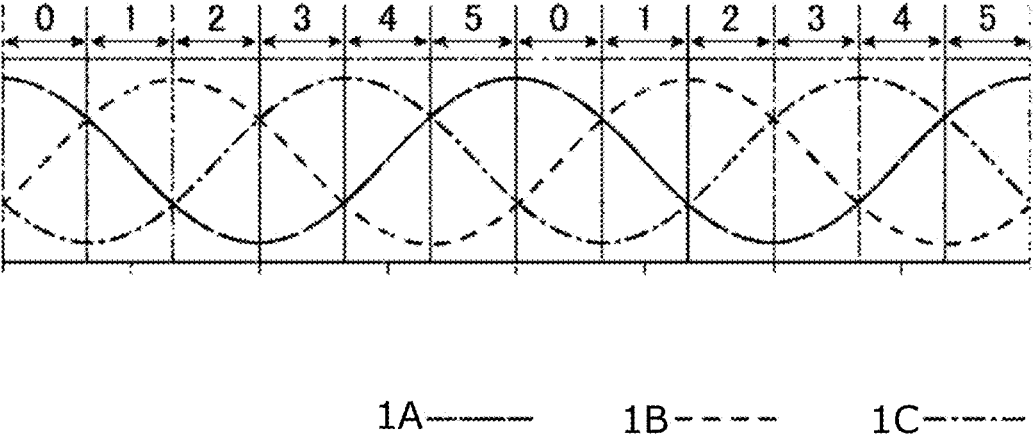
FIG. 10 is a diagram showing two periods of a first sensor signal.
Figure 11:
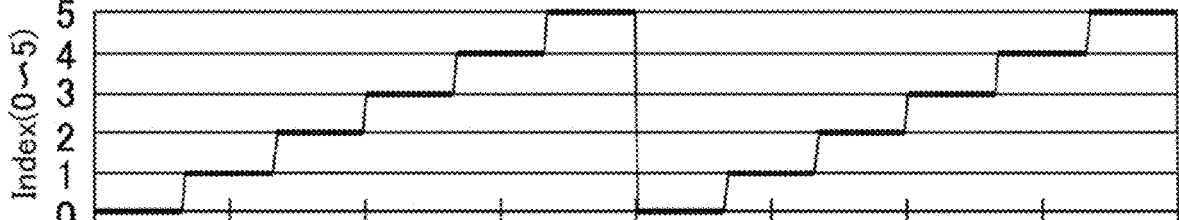
FIG. 11 is a diagram showing two periods of the first sensor signal.

FIGS. 10 and 11 are diagrams showing two periods of the first sensor signal.

The signal from the 1A phase receiving coil 2311 is referred to as a 1A phase signal. The signal from the 1B phase receiving coil 2312 is referred to as a 1B phase signal. The signal from the 1C phase receiving coil 2313 is referred to as a 1C phase signal.

The substitute calculation processing unit 3170 compares the magnitude of analog signals of the three phases (for example, using a comparator), and further outputs an index value from the combination of the results.

Examples of the relationship between the magnitude relationship of the analog signals of the three phases and the index values are shown below.

"1A phase signal≥1B phase signal≥1C phase signal,
1A phase signal≥1C phase signal"→Index
Value: "0"

"1A phase signal<1B phase signal≥1C phase signal,
1A phase signal≥1C phase signal"→Index
Value: "1"

"1A phase signal<1B phase signal≥1C phase signal,
1A phase signal<1C phase signal"→Index
Value: "2"

"1A phase signal<1B phase signal<1C phase signal,
1A phase signal<1C phase signal"→Index
Value: "3"

"1A phase signal≥1B phase signal<1C phase signal,
1A phase signal<1C phase signal"→Index
Value: "4"

"1A phase signal≥1B phase signal<1C phase signal,
1A phase signal≥1C phase signal"→Index
Value: "5"

The index value calculated by the substitute calculation processing unit 3170 is stored in the substitute-value storage memory 3230 of the operation-mode control unit 3200. In this manner, a substitute value is obtained at 40 Hz, and a variation in this value is monitored. If the user is not using the measuring device (micrometer 1000), there is no change in the index value. When the user starts to use the measuring device (micrometer 1000), the rotor 2100 rotates together with the spindle 1200, and the index value also changes. The operation-mode control unit 3200 immediately switches the operation mode of the signal processing unit 3100 to the measurement operation execution mode using the change in the index value as the trigger.

That is, as the internal processes in the signal processing unit 3100, all the functional units of the signal processing unit 3100 that have been in the standby state are activated, the position (angle) of the displacement sensor (rotary encoder) 2000 is calculated, and the number of revolutions is also counted. From these processes, the absolute position of the spindle 1200 is calculated. Therefore, the correct absolute position of the spindle 1200 can be reliably calculated without the risk of skipping the rotation of the spindle 1200. Whether or not the position is displayed on the display unit 1300 will be described later.

In the above example, for example, the position of the index value "0" in the 0th period and the position of the index value "0" in the first period of the next period cannot be distinguished only from the index value. Therefore, in this case, if the spindle 1200 rotates 1/16 in 1/40 second, a variation of the displacement sensor 2000 cannot be detected from this index value. For this reason, the detection frequency of the index value in the sleep mode is determined by also taking into consideration the fineness of the scale pattern 2120. The index value needs to be monitored at a frequency faster than 1/16 revolution of the speed at which the user rotates the spindle 1200 (a revolution for "the number of scale pattern periods included in the range in which the absolute position can be calculated").

Figure 12:
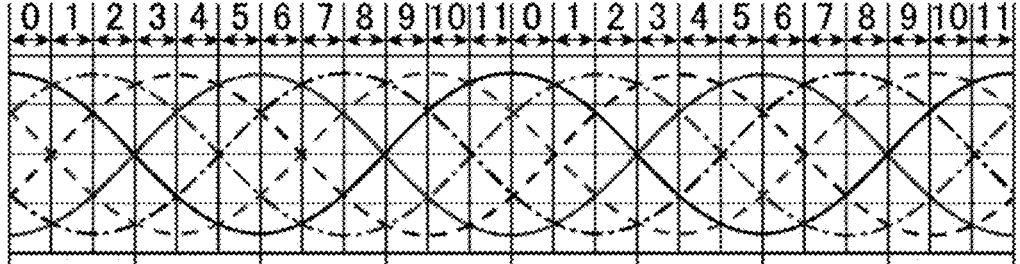
FIG. 12 is a diagram showing, as an example, one period of the first sensor signal divided into 12 stages with index values.

Some variation examples of the index value are described. When the magnitude of a three-phase signal with a 120° phase difference is directly compared, one period can be divided into six. In addition, if an inverted three-phase signal obtained by inverting the three-phase signal, is added to be a six-phase signal, one period can be divided into 12. FIG. 12 shows this relationship. If the index value can be calculated more finely, a slight variation of the displacement sensor 2000 can be detected immediately.

Figure 13:
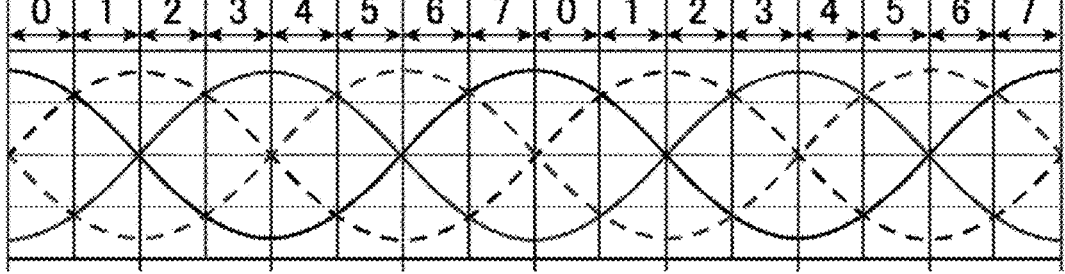
FIG. 13 is a diagram showing, as an example, one period of a two-phase signal divided into eight stages.

The index value can be calculated not only from a three-phase signal but also from a two-phase signal. If the sensor signal is a two-phase signal with a 90° phase difference, one period can be divided into four. Alternatively, one period can be divided into eight according to a magnitude comparison of a four-phase signal obtained by adding an inverted two-phase signal to the two-phase signal. FIG. 13 shows this relationship.

(Display Control)

The display-mode control unit 3300 switches between on and off of the display of the display unit 1300. In other words, the display-mode control unit 3300 causes the display control unit 3400 to switch between a display-on mode and a display-off mode. Here, the display-on mode is a mode in which the measurement value (spindle position) is displayed on the display unit 1300 (display on). The display-off mode is a mode in which the measurement value (spindle position) is not displayed on the display unit 1300 (display off).

Figure 8:
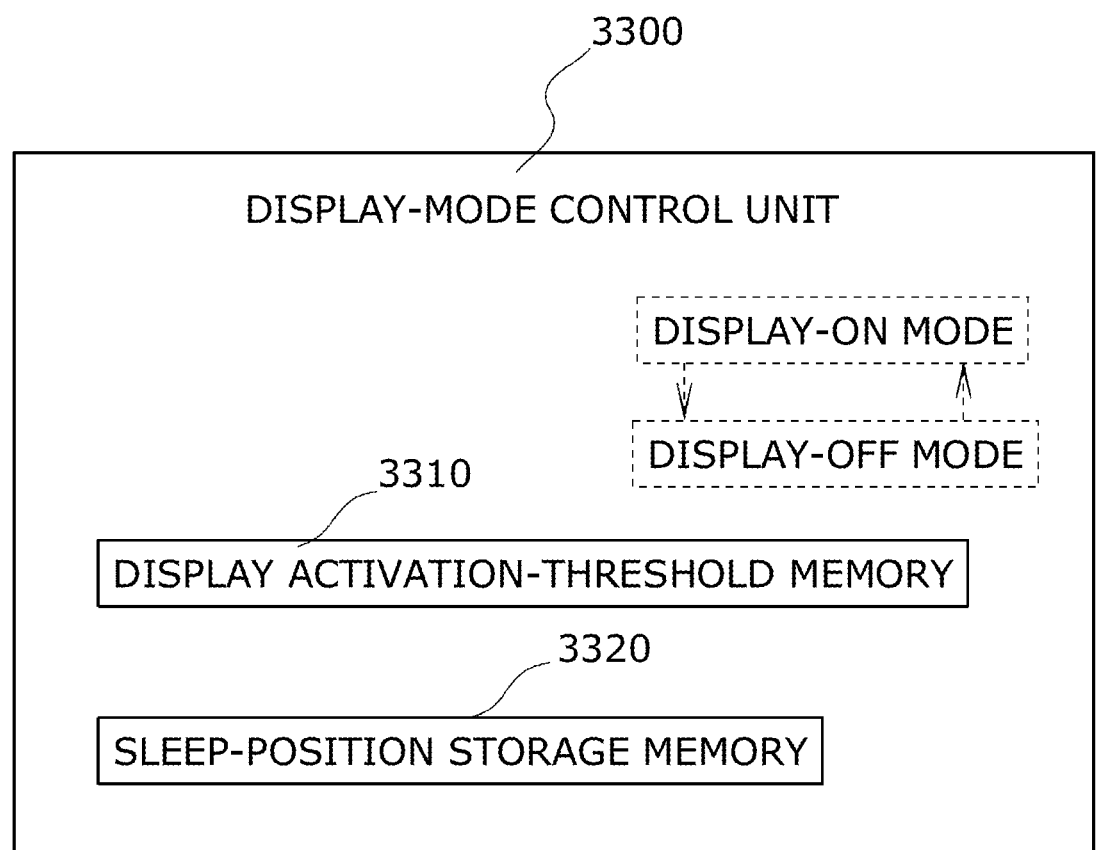
FIG. 8 is a functional block diagram showing a display-mode control unit.

FIG. 8 is a functional block diagram showing the display-mode control unit 3300.

The display-mode control unit 3300 includes a display activation-threshold memory 3310 and a sleep-position storage memory 3320.

The amount of displacement of a movable element (in this case, the spindle 1200) is set in the display activation-threshold memory 3310 as a threshold for the display of the display unit 1300 to return from the sleep mode. For example, 1/4 revolution of the spindle 1200 (or the amount of displacement equivalent to 1/4 revolution) is set as the display activation threshold. Needless to say, the display activation threshold may be 1/6 revolution or 1/8 revolution. The threshold (display activation threshold) may be set by a manufacturer at the time of shipment, or by the user according to the user's preference. To the user, even though the signal processing unit 3100 is internally activated to perform the detection operation of the displacement sensor 2000, if the display unit 1300 does not light up (does not return), the sleep mode appears to continue. Therefore, this threshold (display activation threshold) is understood by the user as the amount of operation required to return from the sleep mode to the normal measurement operation execution mode.

The sleep-position storage memory 3320 stores position information on the spindle (movable element) 1200 at that time as the sleep position when the signal processing unit 3100 is switched to the sleep mode. It has already been described that the operation mode of the signal processing unit 3100 is switched to the sleep mode by the operation-mode control unit 3200. When the signal processing unit 3100 is switched to the sleep mode, the display-mode control unit 3300 stores the information as the sleep position in the sleep-position storage memory 3320.

When the operation mode of the signal processing unit 3100 is switched to the sleep mode by the operation-mode control unit 3200, the display-mode control unit 3300 also switches the operation mode of the display control unit 3400 to the display-off mode. On the other hand, the display-mode control unit 3300 has a threshold for the display unit 1300 to return from the display-off mode to the display-on mode, and this threshold is different from the threshold to switch the operation mode of the signal processing unit 3100. After the signal processing unit 3100 switches (returns) to the measurement operation execution mode, the display-mode control unit 3300 receives the latest information on the spindle position from the position composition unit 3162. The display-mode control unit 3300 compares the latest spindle position with the stored sleep position. When the displacement of the spindle 1200 exceeds the display activation threshold, the display-mode control unit 3300 switches the operation mode of the display control unit 3400 to the display-on mode. Then, the display is controlled by the display control unit 3400 to display the measurement value and other necessary information on the display unit 1300.

In the above description, in order to avoid skipping the rotation of the spindle 1200, if there is a slight variation of the displacement sensor 2000, the signal processing unit 3100 is immediately activated to monitor the spindle position. However, there are some cases in which the user does not intentionally move the spindle 1200 to start a measurement, but simply desires to move the measuring device (micrometer 1000) to another place. If the display is sensitive to an unintentional variation of the displacement sensor 2000 and returns to the display-on mode, this is an extra power consumption. According to the present exemplary embodiment, the display unit 1300 is turned on only when the user intentionally operates the measuring device (micrometer 1000) in order for the display unit 1300 to return from sleep mode. This eliminates unnecessary waste of display power for the user, and leads to longer battery life and reduced maintenance costs.

Note that, the display-off mode is not limited to displaying nothing on the display unit 1300. Whereas the position of the spindle 1200 or information is updated and displayed real time on the display unit 1300 in the display-on mode, not all information is displayed in the display-off mode. In the display-off mode, a message may be displayed on the display unit 1300, for example, "In display-off mode" or "Please rotate spindle X° further to activate".

In the first exemplary embodiment, the rotary encoder (displacement sensor) 2000 outputs a set of two sensor signals, and uses, in the sleep mode, one of the two sensor signals (here, the first sensor signal) to monitor a variation of the displacement sensor 2000. As a method of measuring the absolute position, there is a method of using a set of three or more sensor signals with different periods obtained from three or more scale patterns 2120 having three or more tracks with different periods. In this case, instead of using all the three sensor signals, the index value may each be calculated from one or two of the three sensor signals. Alternatively, two sensor signals may be combined to calculate a single index value. If a sensor signals has three phases, an index value may be calculated from a magnitude comparison of the signal values of two sensor signals, that is, a six-phase sensor signal to monitor a variation in the index value.

Second Exemplary Embodiment

Figure 14:
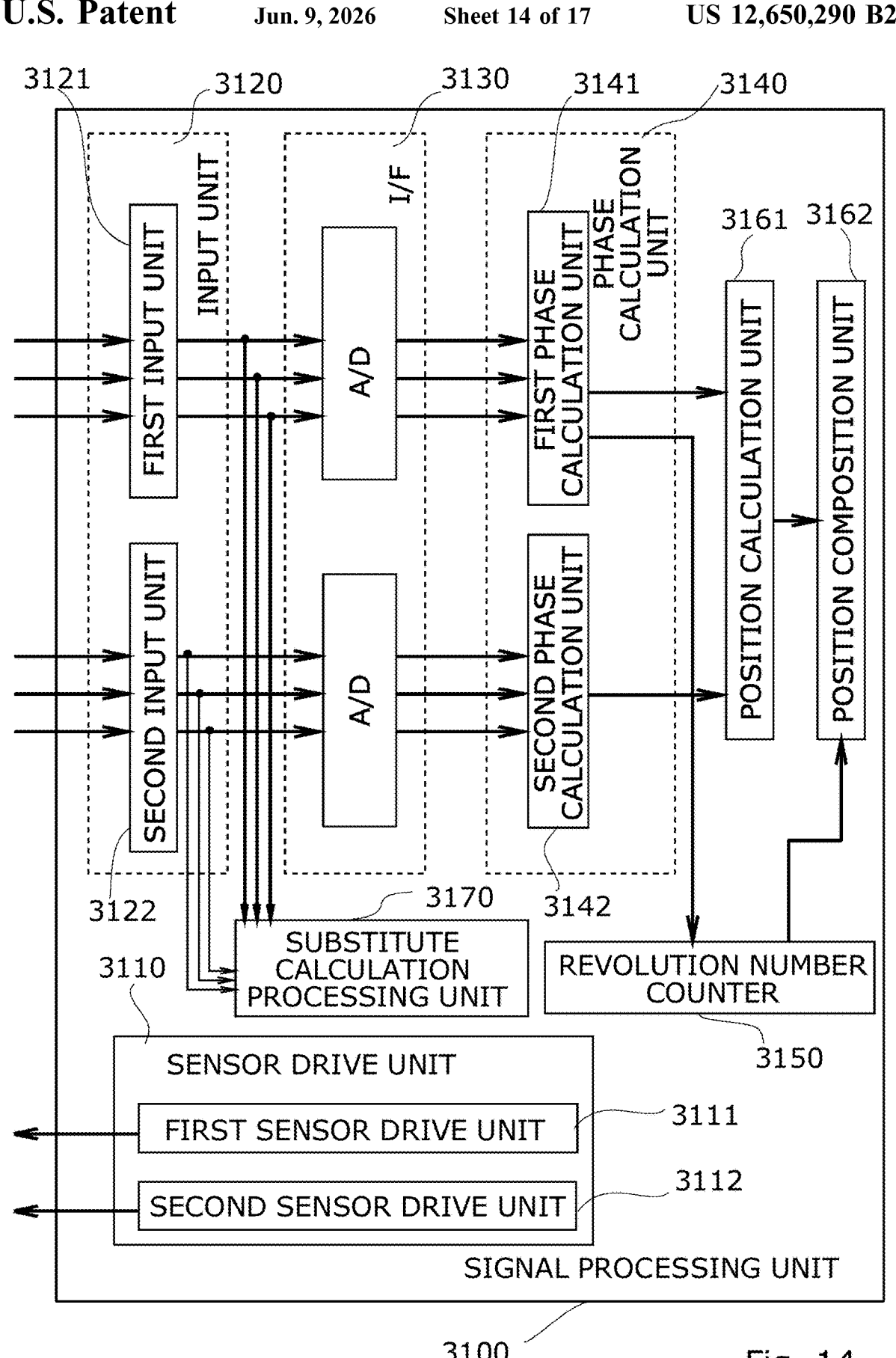
FIG. 14 is a functional block diagram showing a signal processing unit in a second exemplary embodiment.

In the above first exemplary embodiment, only the first rotor pattern (first scale pattern) 2121 is used to calculate the index value. Here, in a second exemplary embodiment, the first rotor pattern (first scale pattern) 2121 and the second rotor pattern (second scale pattern) 2122 are used alternately to calculate the index value. In this case, the sensor drive unit 3110 alternately applies drive signals from the first sensor drive unit 3111 and the second sensor drive unit 3112 to the first transmitting coil 2221 and the second transmitting coil 2222, respectively. The substitute calculation processing unit 3170 in FIG. 14 receives not only the output of the first input unit 3121, but also the output of the second input unit 3122.

Figure 15:
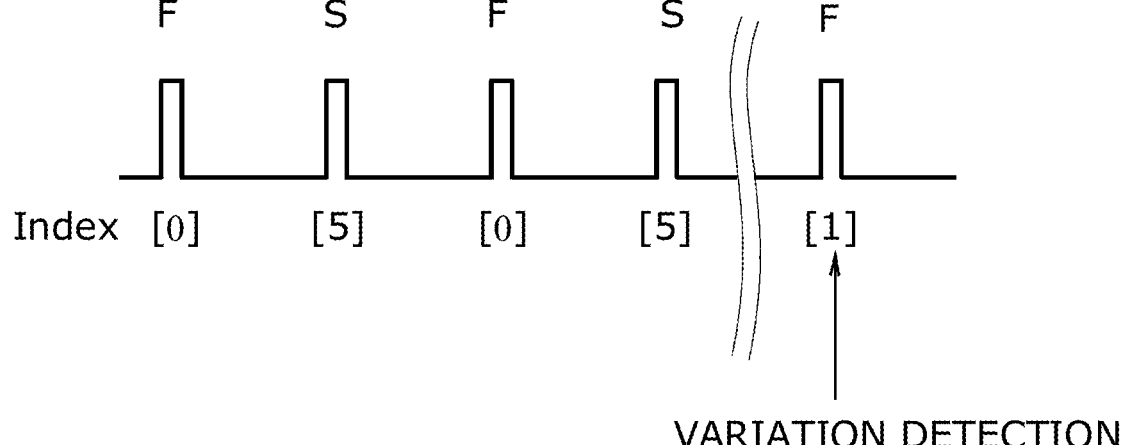
FIG. 15 is a diagram showing, as an example, that index values are obtained alternately from a first rotor pattern and a second rotor pattern in the second exemplary embodiment.

The process of calculating an index value itself is the same as in the first exemplary embodiment, and the index value can be calculated simply by the magnitude comparison of a three-phase sensor signal, for example. As shown in FIG. 15, the first rotor pattern 2121 and the second rotor pattern 2122 are read alternately at a certain frequency (for example, 40 Hz). In FIG. 15, "F" denotes the first rotor pattern 2121, which is a dense track, and "S" denotes the second rotor pattern 2122, which is a sub-track. That is, a first index value from the first sensor signal and a second index value from the second sensor signal are calculated alternately. The first index value and the second index value calculated in this manner are sequentially stored in the substitute-value storage memory 3230 and compared with the previous respective corresponding values to check whether there is any change. If there is a change in either the first index value or the second index value, the operation-mode control unit 3200 determines that the displacement sensor 2000 has varied, and causes the operation mode of the signal processing unit 3100 to return to the measurement operation execution mode.

Figure 16:
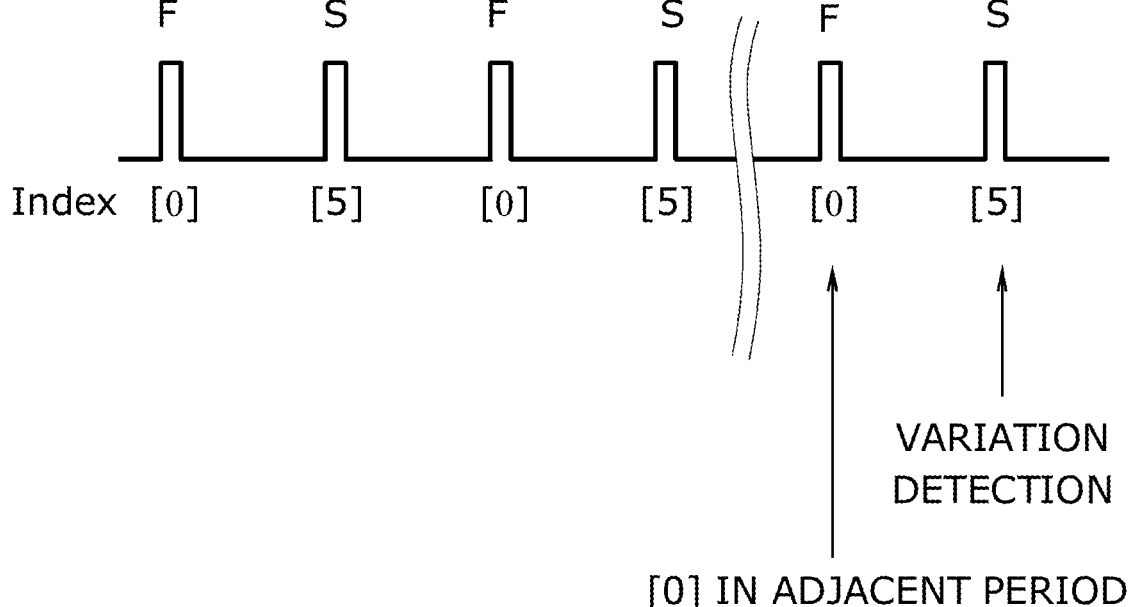
FIG. 16 is a diagram showing, as an example, that index values are obtained alternately from the first rotor pattern and the second rotor pattern in the second exemplary embodiment.

First, since there is only one combination pattern of the first index value and the second index value within a revolution, by obtaining the first index value and the second index value, the rotation angle within a revolution can be approximately determined within the resolution of the index values. The current position of the spindle 1200 is stored in the current-position storage memory 3210. The combination of the two index values should be consistent with the current position of the spindle 1200. If they are inconsistent, some error can have occurred during the sleep mode. In addition, from only one index value (for example, the first index value), it is not possible to determine which period the index value is in, as described above. Unfortunately, if the spindle rotates exactly $\frac{1}{16}$ at 40 Hz, for example, this variation cannot be recognized from the first index value as shown in FIG. 16. However, a change in the second index value can be detected at the next detection timing. Therefore, a variation of the displacement sensor 2000 can be detected more reliably.

In the above example, the first rotor pattern (first scale pattern) 2121 and the second rotor pattern (second scale pattern) 2122 are used alternately, but are not limited to "alternating". For example, a first substitute value based on the first rotor pattern (first scale pattern) 2121 may be continuously acquired nine times, followed by a second substitute value based on the second rotor pattern (second scale pattern) 2122 once, and this acquisition pattern may be repeated.

Note that the number of times the first substitute value is continuously acquired may be randomly determined instead of a fixed cycle. By occasionally acquiring the second substitute value different from the first substitute value, it is possible to compensate for information that cannot be recognized only from the first substitute value (for example, coarse absolute position, internal errors, and the like).

If three or more sensor signals with different periods are obtained from the scale pattern 2120 having three or more tracks with different periods, the index value may be calculated by replacing each signal in turn or in a fixed order for each sampling operation. If four sensor signals are obtained from four tracks, only two or three signals may be used to calculate the index value instead of using the four signals.

The following are added for the sake of clarity.

In a displacement sensor that obtains a set of multiple sensor signals with different periods from a scale pattern having multiple tracks with different periods, in the measurement operation execution mode, the multiple sensor signals are simultaneously acquired at the same timing in a single sampling operation to obtain a measurement value, and such synchronized sensor signals are combined to obtain a single measurement value. In the first exemplary embodiment, the rotary encoder (displacement sensor) 2000 outputs a set of two sensor signals, and one of the sensor signals is used in the sleep mode to monitor a variation of the displacement sensor 2000. In the second exemplary embodiment, the first index value from the first sensor signal and the second index value from the second sensor signal are calculated, but either the first sensor signal is the second sensor signal are acquired in a single sampling, instead of acquiring the first sensor signal and second sensor signal simultaneously in a single sampling operation. The pair of the first sensor drive unit 3111 and the first input unit 3121 and the pair of the second sensor drive unit 3112 and the second input unit 3122 are activated/deactivated alternately. In the present invention, including the first and second exemplary embodiments, all the substantial functions of the signal processing unit 3100 are not simultaneously activated at any point during the sleep mode.

A substitute value for monitoring a variation of the displacement sensor during the sleep mode is obtained using fewer sensor signals than those acquired in a single sampling in the measurement operation execution mode.

Third Exemplary Embodiment

In the above first and second exemplary embodiments, an index value is used as a substitute value.

As a third exemplary embodiment, an AD conversion value of a sensor signal is used as a substitute value.

Figure 17:
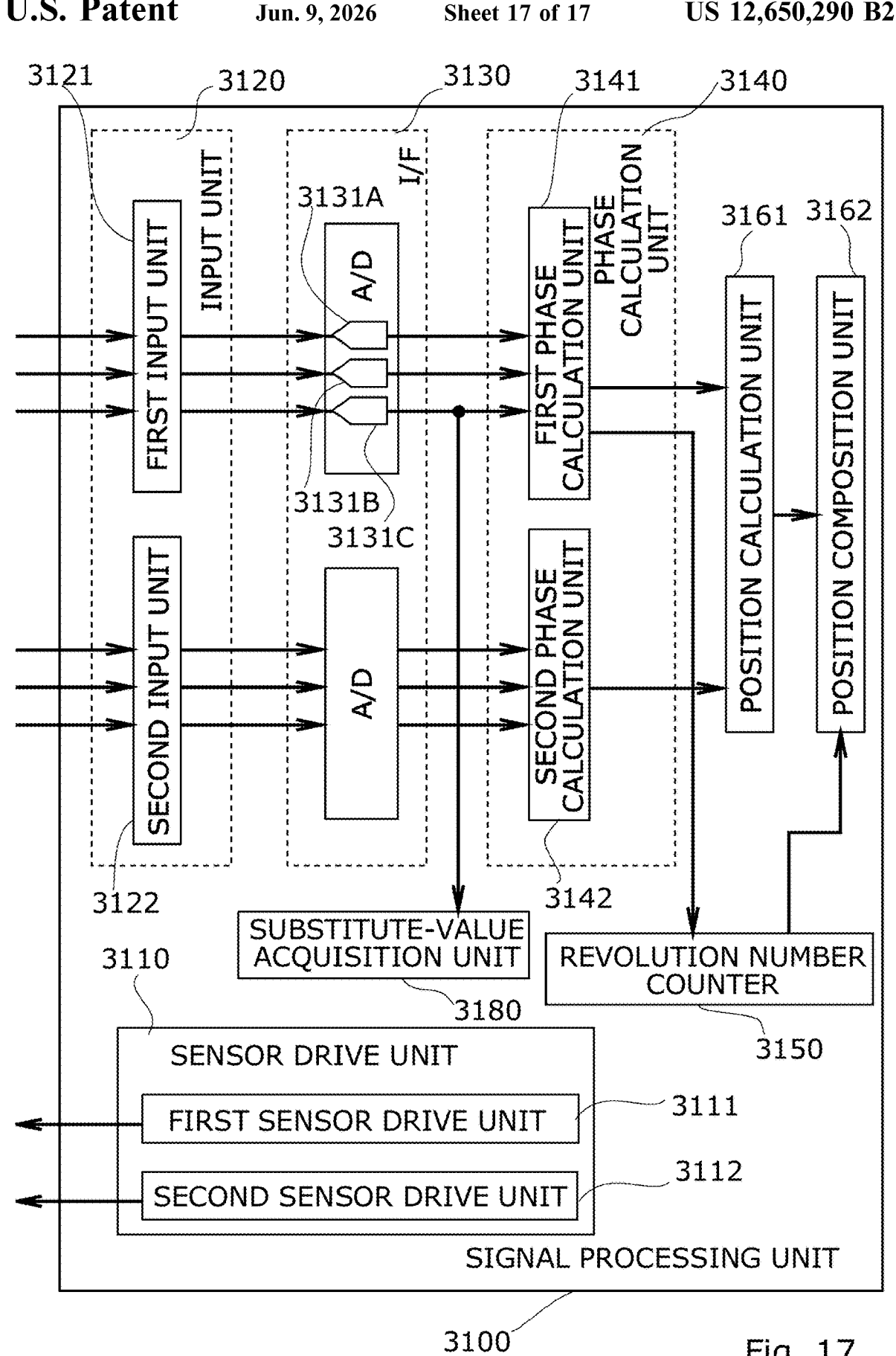
FIG. 17 is a partial functional block diagram showing a signal processing unit in a third exemplary embodiment.

FIG. 17 is a part of a functional block diagram showing the signal processing unit 3100 in the third exemplary embodiment. In FIG. 17, the substitute-value acquisition unit acquires an AD conversion value from one of AD converters.

The operation in the sleep mode is described below.

During the sleep mode, the functional units of the signal processing unit 3100 that operate are a part of the sensor drive unit 3110 (first sensor drive unit 3111), a part of the input unit 3120, a part of the AD converter 3130, and the substitute-value acquisition unit 3180. The other functional units do not operate and are in the standby state. In the present exemplary embodiment, a three-phase sensor signal is input to the first input unit 3121 as the first sensor signal, but amplification and shaping in the input unit 3120 and AD conversion are performed only for one phase, and the other phases are not processed. In other words, AD conversion is performed only for one phase.

In the sleep mode, the signal processing unit 3100 applies a drive current from the sensor drive unit 3110 (first sensor drive unit 3111) to the drive signal transmitter 2220 (first transmitting coil 2221) of the stator 2200 at a frequency of 40 Hz. An electromotive force (induced current) is induced in the first rotor pattern 2121 coupled with the first transmitting coil 2221. In the first receiving coil 2310 of the stator 2200 coupled with the first rotor pattern 2121, an electromotive force (induced current) of a magnitude corresponding to the degree of overlap between the two is generated. Since the first receiving coil 2310 has three phases from the 1A phase receiving coil 2311, the 1B phase receiving coil 2312, and the 1C phase receiving coil 2313, a three-phase sensor signal is input to the first input unit 3121 of the signal processing unit 3100. Only one of the three phases (for example, the 1C phase signal) is amplified and shaped and input to the AD converter 3130.

The AD converter 3130 includes a first AD converter 3131 and a second AD converter 3132. In addition, the first AD converter 3130 includes AD converters 3131A, 3131B, and 3131C corresponding to the 1A phase signal, the 1B phase signal, and the 1C phase signal, respectively. The AD converter 3131C digitally converts the 1C phase signal at 12 or 16 bits, for example. The value of the digitally converted sensor signal is input to the substitute-value acquisition unit 3180 and further stored in the substitute-value storage memory 3230 of the operation-mode control unit 3200. In this case, the AD conversion process may be considered to correspond to a "substitute calculation process for calculating a substitute value. The operation-mode control unit 3200 uses the value of the digitally converted sensor signal as an index value and monitors a variation in this index value. If there is a variation in the value of the digitally converted sensor signal, this triggers the signal processing unit 3100 to immediately switch the operation mode to the measurement operation execution mode.

For example, a 16-bit digital value can distinguish 65536 stages of the value of the sensor signal. If the rotor 2100 moves to the same index value in the next period before the next sampling is performed, this cannot be detected, which is the same as the index value in the first exemplary embodiment. However, it is almost impossible for the rotor 2100 to move to the same index value distinguished in the 65536 stages at the next sampling timing. Therefore, by using the digitally converted value of one phase of a three-phase sensor signal as an index value and monitoring this index value, a variation of the displacement sensor 2000 can be reliably detected.

The AD converter included in the signal processing unit 3100 for calculating the position (angle) of the spindle (movable element) 1200 in the measurement operation execution mode is preferably used as the AD converter for calculating a substitute value. The AD converter is provided, for example, 8 bits, 12 bits, 16 bits, or more, depending on the resolution of the position (angle) calculation, and is used for the "substitute calculation process for calculating a substitute value.

In obtaining an AD conversion value as a substitute value, sensor signals from receiving coils which are different at each sampling may be AD converted, as described in the second exemplary embodiment, and compared with the previous respective corresponding values for any change.

The present invention is not limited to the above embodiments, and can be modified as needed without departing from the gist.

1000 Displacement measuring apparatus (Digital micrometer)
1100 Main frame
1110 Anvil
1200 Spindle (moving element, rotating body)
1210 Thimble
1300 Display unit
2000 Rotary encoder (Displacement sensor)
2100 Rotor
2110 Rotor substrate
2120 Scale pattern
2121 First rotor pattern
2122 Second rotor pattern
2200 Stator
2210 Stator substrate
2220 Driving signal transmitter
2221 First transmitting coil
2222 Second transmitting coil
2300 Detection signal receiver
2310 First receiving coil
2311 1A phase receiving coil
2312 1B phase receiving coil
2313 1C phase receiving coil
2320 Second receiving coil
2321 2A phase receiving coil
2322 2B phase receiving coil
2323 2C phase receiving coil
3000 Control unit
3100 Signal processing unit
3110 Sensor drive unit
3111 First sensor drive unit
3112 Second sensor drive unit
3120 Input unit
3121 First input unit
3122 Second input unit
3130 AD converter
3131 First AD converter
3132 Second AD converter
3140 Phase calculation unit
3141 First phase calculation unit

19

3142 Second phase calculation unit
3150 Revolution number counter
3161 Position calculation unit
3162 Position composition unit
3170 Substitute calculation processing unit
3180 Substitute-value acquisition unit
3200 Operation-mode control unit
3210 Current-position storage memory
3220 Timer
3230 Substitute-value storage memory
3300 Display-mode control unit
3310 Display activation-threshold memory
3320 Sleep-position storage memory
3400 Display control unit

The invention claimed is:

1. A displacement measuring apparatus comprising:
a displacement sensor configured to output at least two sensor signal sets, each set comprising at least one sensor signal, each sensor signal of the at least two sensor signal sets having a value dependent on a sensed displacement or position, and sensor signals in each sensor signal set having a period different from sensor signals in each other sensor signal set;
a signal processing unit configured to process the at least two sensor signal sets; and
an operation-mode control unit configured to switch an operation mode of the signal processing unit, wherein
the operation mode of the signal processing unit includes:
a measurement operation execution mode to calculate the displacement or position as a measurement value using the at least two sensor signal sets obtained from the displacement sensor; and
a sleep mode to reduce power consumption compared to the measurement operation execution mode,
the signal processing unit performs, in the sleep mode, a substitute calculation process at a predetermined sampling frequency to sequentially calculate substitute values related to the displacement or position, each substitute value being calculated using a corresponding part of the sensor signals obtained from less than all of the at least two sensor signal sets to be used in the measurement operation execution mode, and
the operation-mode control unit detects a variation of the displacement sensor when there is a variation in the substitute values, and in response to the detection, cancels the sleep mode and switches the signal processing unit to the measurement operation execution mode.

2. The displacement measuring apparatus according to claim 1, wherein each sensor signal set comprises at least two sensor signals, and wherein for each substitute calculation process:
an index number is prepared in advance for the corresponding part of the sensor signals to distinguish a pattern of a magnitude relationship of signal values of the corresponding part of the sensor signals, and
the signal processing unit calculates, in the sleep mode, the index number as the substitute value based on a comparison of the magnitude relationship between the signal values of the corresponding part of the sensor signals.

3. The displacement measuring apparatus according to claim 1, wherein each sensor signal set comprises at least two sensor signals, and wherein
the predetermined sampling frequency is periodic or non-periodic; and

the corresponding part of the sensor signal set used in each substitute calculation process is alternated between consecutive sampling operations or between consecutive groups of sampling operations.

4. The displacement measuring apparatus according to claim 3, wherein
the operation-mode control unit compares substitute values calculated using the same corresponding parts of the sensor signals as corresponding substitute values, detects the variation of the displacement sensor when a substitute value calculated during a current sampling operation varies from a latest corresponding substitute value, and in response to the detection, cancels the sleep mode and switches the signal processing unit to the measurement operation execution mode.

5. The displacement measuring apparatus according to claim 1, wherein the signal processing unit calculates, in the sleep mode, an AD conversion value of the corresponding part of the sensor signals as the substitute value for each sampling operation.

6. The displacement measuring apparatus according to claim 1, further comprising:
a display unit; and
a display-mode control unit configured to switch a mode of the display unit between a display-off mode and a display-on mode, wherein
the display-mode control unit has a preset amount of variation of the displacement sensor as a display activation threshold to switch from the display-off mode to the display-on mode, and
the display-mode control unit cancels the display-off mode and switches to the display-on mode when the variation of the displacement sensor is detected in the sleep mode and the amount of variation of the displacement sensor equal to or greater than the display activation threshold is detected.

7. The displacement measuring apparatus according to claim 1, wherein
the displacement sensor is a rotary encoder including a rotor attached to a rotating body and configured to rotate with the rotating body, and a stator disposed opposite the rotor with a predetermined gap, and
the rotary encoder is an absolute type rotary encoder configured to indicate an absolute position within a revolution or half a revolution of the rotor from the sensor signals in each sensor signal set.

8. The displacement measuring apparatus according to claim 7, further comprising:
a spindle; and
a main frame configured to hold the spindle to be movable forward and backward in an axial direction, wherein
the rotor rotates with the spindle,
the stator is attached to the main frame, and
the signal processing unit calculates, in the measurement operation execution mode, the displacement or position of the spindle as a measurement value from a total number of revolutions of the spindle and the absolute position within a revolution or half a revolution.

9. A control apparatus of a displacement measuring apparatus, the control apparatus comprising:
a signal processing unit configured to receive at least two sensor signal sets from a displacement sensor and to process the at least two sensor signal sets, each set comprising at least one sensor signal, each sensor signal of the at least two sensor signal sets having a value dependent on a sensed displacement or position, and sensor signals in each sensor signal set having a period different from sensor signals in each other sensor signal set; and an operation-mode control unit configured to switch an operation mode of the signal processing unit, wherein the operation mode of the signal processing unit includes:

a measurement operation execution mode to calculate the displacement or position as a measurement value using the at least two sensor signal sets obtained from the displacement sensor; and a sleep mode to reduce power consumption compared to the measurement operation execution mode, the signal processing unit performs, in the sleep mode, a substitute calculation process at a predetermined sampling frequency to sequentially calculate substitute values related to the displacement or position, each substitute value being calculated using a corresponding part of the sensor signals obtained from less than all of the at least two sensor signal sets to be used in the measurement operation execution mode, and the operation-mode control unit detects a variation of the displacement sensor when there is a variation in the substitute values, and in response to the detection, cancels the sleep mode and switches the signal processing unit to the measurement operation execution mode.

10. A control method of a displacement measuring apparatus, the displacement measuring apparatus comprising:

a signal processing unit configured to receive at least two sensor signal sets from a displacement sensor and to process the at least two sensor signal sets, each set comprising at least one signal phase, each sensor signal of the at least two sensor signal sets having a value dependent on a sensed displacement or position, and sensor signals in each sensor signal set having a period different from sensor signals in each other sensor signal set; and an operation-mode control unit configured to switch an operation mode of the signal processing unit, the operation mode of the signal processing unit including:

a measurement operation execution mode to calculate the displacement or position as a measurement value using the at least two sensor signal sets obtained from the displacement sensor; and a sleep mode to reduce power consumption compared to the measurement operation execution mode, the control method comprising:

performing, by the signal processing unit a substitute calculation process at a predetermined sampling frequency in the sleep mode to sequentially calculate substitute values related to the displacement or position, each substitute value being calculated using a corresponding part of the sensor signals obtained from less than all of the at least two sensor signal sets to be used in the measurement operation execution mode; and detecting, by the operation-mode control unit, a variation of the displacement sensor when there is a variation in the substitute values, and in response to the detection, cancelling the sleep mode and switching the signal processing unit to the measurement operation execution mode.

11. A non-transitory recording medium storing a control program for a displacement measuring apparatus causing, by incorporating a computer in a control unit of the displacement measuring apparatus, the computer to perform functions of:

a signal processing unit configured to receive at least two sensor signal sets from a displacement sensor and to process the at least two sensor signal sets, each set comprising at least one signal phase, each sensor signal of the at least two sensor signal sets having a value dependent on a sensed displacement or position, and sensor signals in each sensor signal set having a period different from sensor signals in each other sensor signal set; and an operation-mode control unit configured to switch an operation mode of the signal processing unit, wherein the operation mode of the signal processing unit includes:

a measurement operation execution mode to calculate the displacement or position as a measurement value using the at least two sensor signal sets obtained from the displacement sensor; and a sleep mode to reduce power consumption compared to the measurement operation execution mode, the signal processing unit performs, in the sleep mode, a substitute calculation process at a predetermined sampling frequency to sequentially calculate substitute values related to the displacement or position, each substitute value being calculated using a corresponding part of the sensor signals obtained from less than all of the at least two sensor signal sets to be used in the measurement operation execution mode, and the operation-mode control unit detects a variation of the displacement sensor when there is a variation in the substitute values, and in response to the detection, cancels the sleep mode and switches the signal processing unit to the measurement operation execution mode.

* * * * *